(12) United States Patent  (10) Patent No.: US 8,910,724 B2
Borgmann et al.  (45) Date of Patent: Dec. 16, 2014

(54) TELESCOPING COULTER SYSTEM AND METHOD

(71) Applicant: Spudnik Equipment Co., LLC, Blackfoot, ID (US)

(72) Inventors: Rainer Borgmann, Blackfoot, ID (US); Rainer Kemper, Idaho Falls, ID (US)

(73) Assignee: Spudnik Equipment Co., LLC, Blackfoot, ID (US)

( * ) Notice: Subject to any disclaimer, the term of this patent is extended or adjusted under 35 U.S.C. 154(b) by 60 days.

(21) Appl. No.: 13/742,196

(22) Filed: Jan. 15, 2013

(65) Prior Publication Data

US 2013/0180740 A1   Jul. 18, 2013

Related U.S. Application Data

(60) Provisional application No. 61/587,023, filed on Jan. 16, 2012.

(51) Int. Cl.
| | |
|---|---|
| *A01D 13/00* | (2006.01) |
| *B23P 11/00* | (2006.01) |
| *A01D 33/14* | (2006.01) |
| *A01B 63/00* | (2006.01) |
| *A01D 33/06* | (2006.01) |

(52) U.S. Cl.
CPC ............. *A01D 33/14* (2013.01); *A01D 13/00* (2013.01); *B23P 11/00* (2013.01); *A01B 63/008* (2013.01); *A01D 33/06* (2013.01)

USPC ............................ 171/124; 172/139; 172/165

(58) Field of Classification Search
USPC ......... 172/138, 139, 144, 165, 166, 752, 417, 172/459, 460, 480, 483, 484, 485, 497; 171/124, 62, 140
See application file for complete search history.

(56) References Cited

U.S. PATENT DOCUMENTS

| | | | | |
|---|---|---|---|---|
| 1,651,673 | A * | 12/1927 | Clary | 172/462 |
| 2,583,241 | A * | 1/1952 | Tranter et al. | 171/109 |
| 3,628,609 | A * | 12/1971 | Graybill | 171/14 |
| 3,726,345 | A * | 4/1973 | Harrell et al. | 171/101 |
| 3,743,023 | A * | 7/1973 | Bedwell | 171/5 |
| 4,231,431 | A * | 11/1980 | Weichel | 171/46 |
| 5,103,623 | A * | 4/1992 | Herrett | 56/14.7 |
| 5,398,771 | A * | 3/1995 | Hornung et al. | 172/311 |
| 7,958,942 | B2 * | 6/2011 | Kalverkamp | 171/124 |
| 8,302,699 | B2 * | 11/2012 | Rocca | 171/45 |
| 2008/0099214 | A1 * | 5/2008 | Kalverkamp | 171/124 |
| 2011/0000687 | A1 * | 1/2011 | Rocca | 171/138 |
| 2011/0209885 | A1 * | 9/2011 | Rocca | 171/138 |

* cited by examiner

*Primary Examiner* — Matthew D Troutman

(74) *Attorney, Agent, or Firm* — Parsons Behle & Latimer

(57) ABSTRACT

A telescoping coulter system for an agricultural machine, operable on ground and having a frame and a moveable structure, includes a coulter arm, having a proximal end with a pivot point, and a distal end bearing a rotatable coulter disk. An extension mechanism connects the frame to the coulter arm, and is configured to translate the coulter arm between a raised transport position not in mechanical conflict with the moveable structure, and a lowered operational position in which the coulter disk can contact the ground and is proximate to the moveable structure.

18 Claims, 4 Drawing Sheets

TELESCOPING COULTER SYSTEM AND METHOD

PRIORITY CLAIM

The present application claims the benefit of U.S. Provisional Patent Application Ser. No. 61/587,023, filed on Jan. 16, 2012 and entitled TELESCOPING COULTER, the disclosure of which is incorporated herein by reference in its entirety.

BACKGROUND

1. Field of the Invention

The present invention relates generally to agricultural equipment. More particularly, the present invention relates to a telescoping coulter that can be associated with an agricultural machine, such as potato harvesting machine or windrower, and a method of making the same.

2. Related Art

A coulter is a cutting tool, such as a sharp disk, that is attached to the beam of a plow or other agricultural machine, and which makes a vertical cut in the soil. Coulters can be used for plowing and preparing soil, and can also be used in connection with harvesting crops. For example, in potato harvesting, a coulter disk is often positioned just before the intake of the harvester to cut the dead and wilted potato vines so that the vines do not build up around the machine intake.

Agricultural equipment that is designed to interact with the ground, such as plows, harrows, harvesters, windrowers, etc., generally includes an operating position and a transport position. In the transport position, ground-contacting elements are retracted to an elevated position, so as not to interfere with transport of the equipment over roadways, etc. During use, these ground-contacting elements are extended to contact the ground.

Sometimes the physical and mechanical relationships between the extended and retracted positions results in machine geometry that can affect the operation of the machine. For example, where a coulter is positioned near the intake of a potato harvester, the associated mechanical structure can place the coulter a significant distance from the intake during operation, largely because a closer position will cause interference between the coulter and the intake structure when in the retracted, transport position. However, a large distance between the coulter and the intake during operation can negatively affect the operation of the device, such as by allowing vine or weed buildup, or allowing product (e.g. potatoes) to fall out of the intake.

The present application seeks to address one or more of the above-referenced issues.

SUMMARY

It has been recognized that it would be advantageous to develop a coulter system in which the coulter can be positioned closer to the intake during operation, yet does not interfere with the intake when in the transport position.

It has also been recognized that it would be advantageous to develop a coulter system in which the proximity of the coulter disk and intake during operation can be adjustable.

It has also been recognized that it would be advantageous to develop a coulter system which is protected from inadvertent lateral loads upon the coulter disk during operation.

In accordance with one embodiment thereof, the present invention provides a telescoping coulter system for an agricultural machine operable on ground and having a frame and a moveable structure. The telescoping coulter system includes a coulter arm, having a proximal end with a pivot point, and a distal end bearing a rotatable coulter disk. An extension mechanism connects the frame to the coulter arm, and is configured to translate the coulter arm between a raised transport position not in mechanical conflict with the moveable structure, and a lowered operational position in which the coulter disk can contact the ground and is proximate to the moveable structure.

In a more specific embodiment thereof, the extension mechanism comprises a translating linkage having an actuating device, first and second levers, connected to the actuating device, and a first linkage, pivotally connecting the first lever to the coulter arm. The pivot point of the coulter arm is connected to the second lever, and operation of the actuating device simultaneously causes the coulter arm to translate and rotate to move the coulter disk between the raised position and the lowered position. In another more specific embodiment, the translating linkage includes an adjustable linkage, interconnecting the actuating device and the second lever, configured to allow adjustment of the proximity of the coulter disk and the moveable structure when in the lowered position.

In accordance with another embodiment thereof, the invention provides a potato harvester having a telescoping coulter system. The harvester comprises an intake, and a coulter disk. The intake has a nose wing, and is moveable between a lowered operating position adjacent the ground, and a raised transport position above the ground. The coulter disk is moveable about a virtual pivot point from a lowered operating position, in which the coulter disk is adjacent the nose wing, and a raised transport position in which the coulter disk does not mechanically interfere with the intake or nose wing.

In another embodiment thereof, the harvester includes a lateral force overload device, disposed at the proximal end of the coulter arm, configured to selectively allow lateral motion of the coulter arm relative to the extension mechanism in response to inadvertent lateral loads upon the coulter disk or coulter arm.

In accordance with another embodiment thereof, the invention provides a method of making a telescoping coulter system for an agricultural device having a moveable structure. The method includes the steps of rotatably attaching a coulter disk to a distal end of a coulter arm, and attaching the coulter arm to an extension mechanism configured to translate the coulter arm between a raised position not in mechanical conflict with the moveable structure, and a lowered operational position in which the coulter disk can contact ground and is proximate to the moveable structure.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

DETAILED DESCRIPTION

Figure 1:
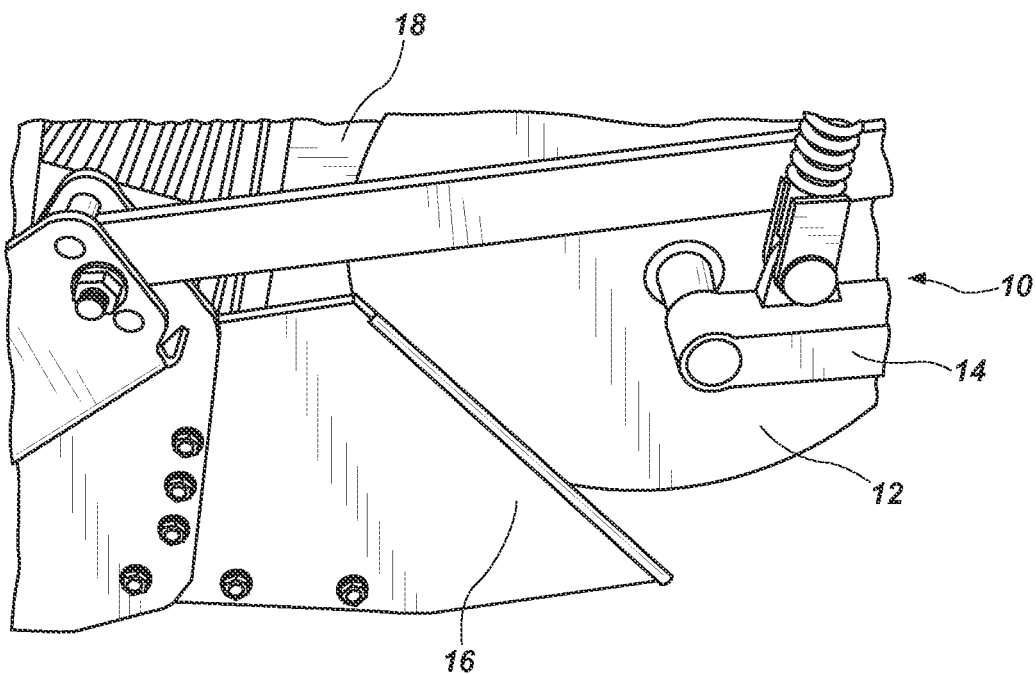
FIG. 1 is a close-up view of a prior art coulter device showing the coulter disk and harvester intake in the raised transport position.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

On a potato harvester, a coulter disk operates to cut potato vines away from the potatoes prior to drawing the potatoes into the harvester intake, so that the vines are not drawn into the intake with the potatoes. However, the geometry of the coulter relative to the intake has an effect on the performance of the harvester. In many cases, vines can build up around the machine intake. Furthermore, potatoes can fall from the intake area of the harvester, in the region of the coulter. This reduces crop yield and/or increases the labor required for a given harvest.

Coulters are used with a wide variety of agricultural equipment, in addition to the potato harvesters particularly mentioned herein, such as windrowers, etc. They are frequently pivotal and spring-loaded, so that they can rise up and pass over hard obstacles inside the ground as they cut. Coulters are also generally retractable, along with other portions of the agricultural machine (e.g. a harvester, windrower, etc.) so that they can be moved between work and transport positions. Unfortunately, in some equipment, such as potato harvesters, the mechanical configuration of the work and transport positions can affect their operation. Shown in FIG. 1 is a prior art coulter device 10 in the raised transport position. This coulter device is attached to a potato harvester. The coulter device 10 includes a coulter disk 12 that is pivotally attached to a coulter arm 14. In the raised position, as shown in FIG. 1, the coulter disk 12 is disposed in abutting relation to, and slightly overlapping, the nose wing 16 of the harvester intake 18. As a practical matter, the coulter disk 12 cannot move any farther back toward the harvester intake 18 (toward the left in FIG. 1) because of direct mechanical interference. The structure of the harvester intake is simply in the way.

Figure 2:
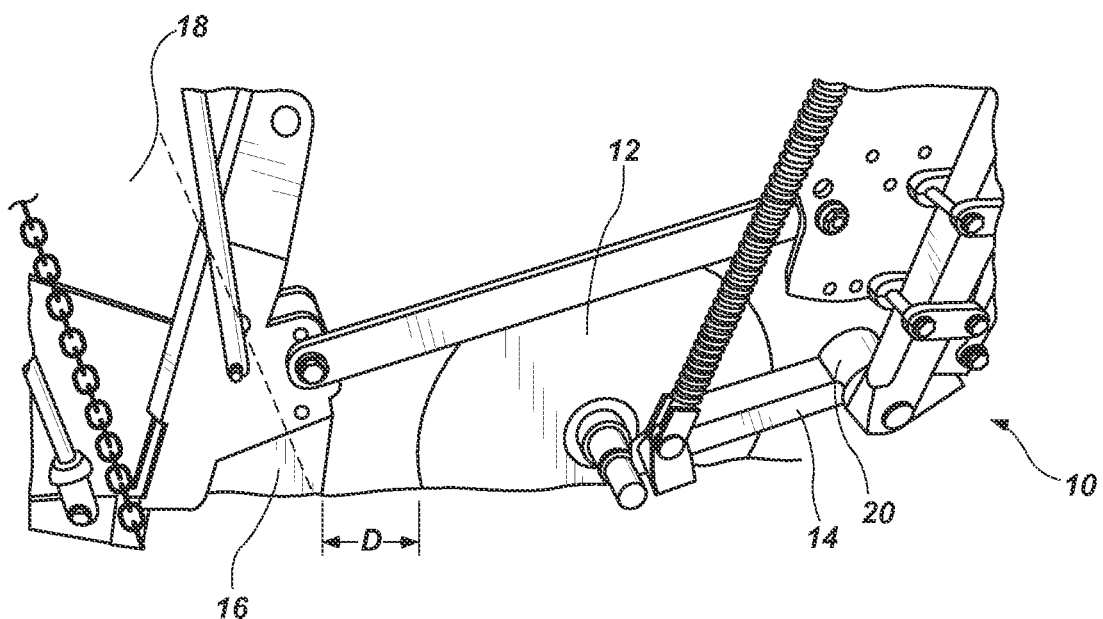
FIG. 2 is a close-up view of a prior art coulter device showing the coulter disk and harvester intake in the lowered operating position.

However, when the coulter device 10 and harvester intake 18 are lowered to their operating position, as shown in FIG. 2, the coulter disk 12 draws away from the nose wing 16 of the harvester intake 18, leaving a relatively large distance D between the coulter disk 12 and the harvester intake 18 in this position. This configuration can negatively affect the operation of the harvester device, such as by allowing vines or weeds to build up around the intake, or allowing product (e.g. potatoes) to fall out of the intake 18. This large distance or opening between the intake 18 and the coulter disk 12 exists largely because, as mentioned above, the disk cannot be moved further back due to mechanical interference with the intake parts when in the transport position, as shown in FIG. 1.

Additionally, the front end of the coulter arm 14 is attached to the harvester at a single pivot point 20. Because the rotatable coulter disk 12 is offset from the center line of the coulter arm 14, the single pivot point causes the coulter disk move on an arc.

Advantageously a telescoping coulter system and method have been developed that allow a coulter on a harvester or other agricultural device to remain close to the intake of the device during operation, yet not interfere with the intake when in the retracted transport position. As used herein, the terms "mechanical conflict" and "mechanical interference" or the like are intended to refer to any condition where two mechanical parts either contact each other in an undesirable way or in an undesirable condition, or are placed in a position where they can or may interfere with operation of each other or cause damage or wear either during operation or movement of the device. Frequently, mechanical parts that conflict with or interfere with each other are parts that are trying to occupy the same space.

Figure 3:
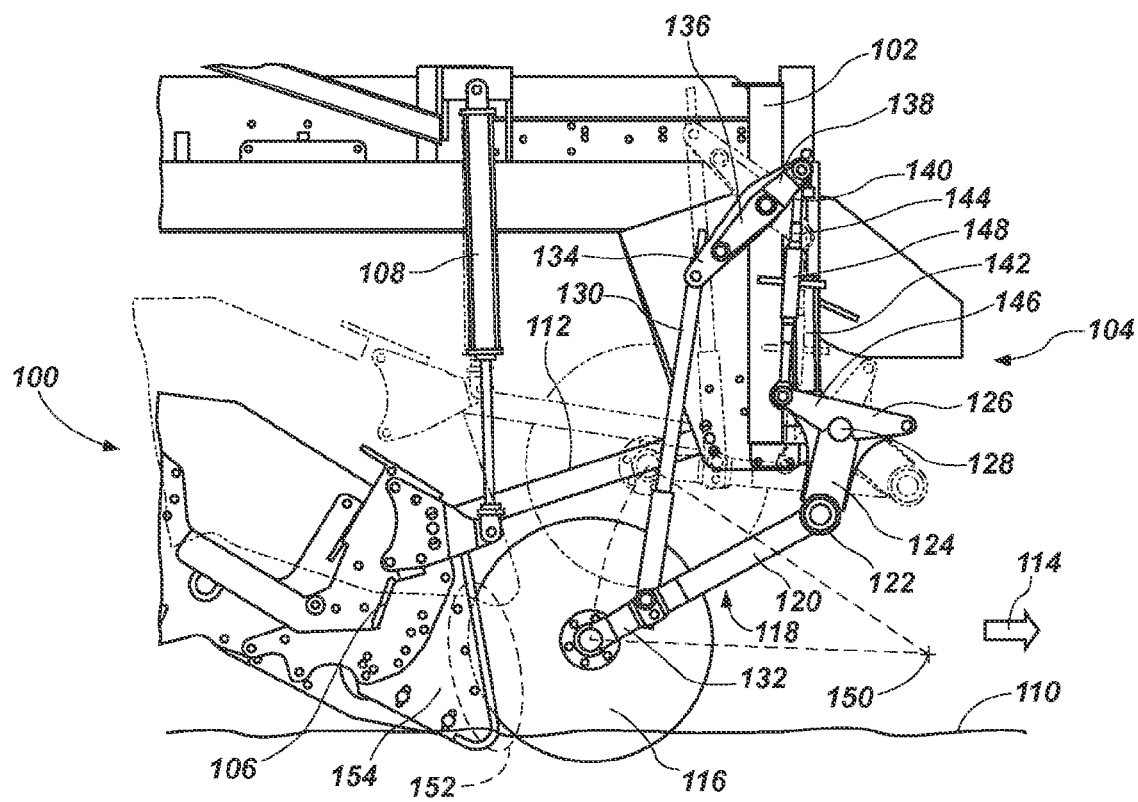
FIG. 3 is a side view of an embodiment of a telescoping coulter in accordance with the present disclosure, showing the coulter disk and associated linkages in the lowered, operational position.
Figure 4:
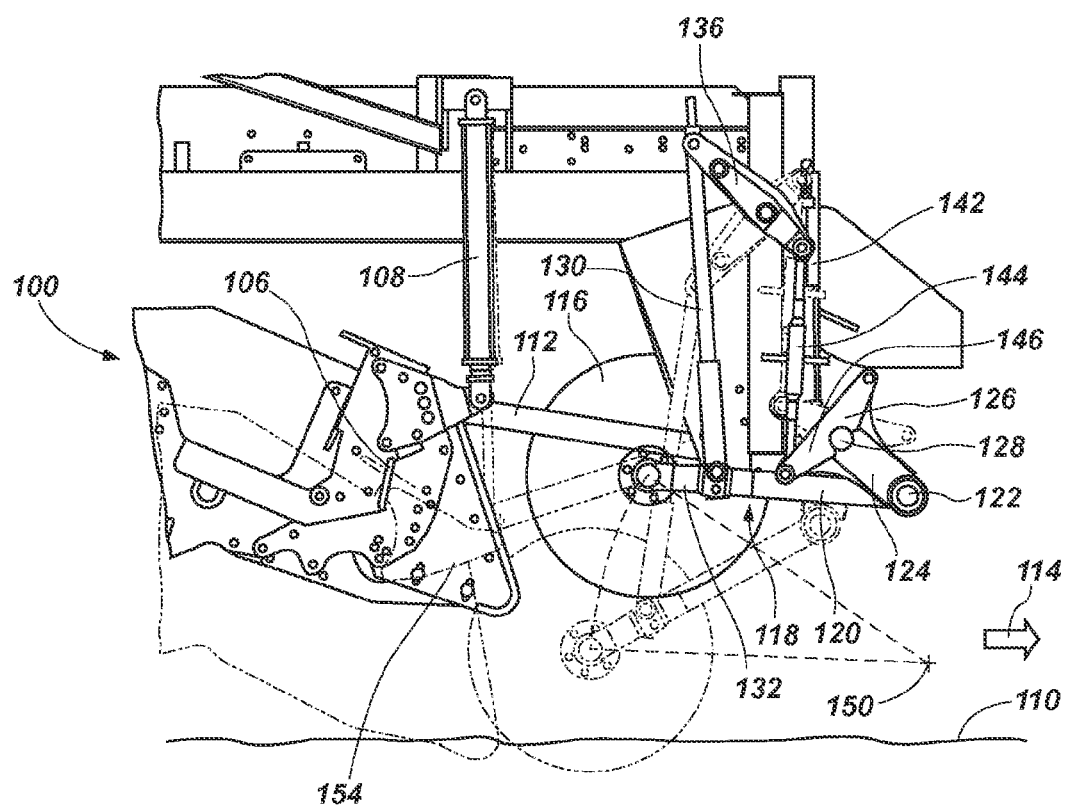
FIG. 4 is a side view of the telescoping coulter of FIG. 3, showing the coulter disk in the raised, transport position.

One embodiment of a harvester having a telescoping coulter system in accordance with the present disclosure is shown in FIGS. 3 and 4. It is to be appreciated that while the views of FIGS. 3 and 4 shown the telescoping coulter associated with a potato harvester, this device can be associated with a wide range of agricultural equipment that uses coulters, and other types of moveable and/or potentially interfering operational structure can be involved. For example, a coulter can be moveable relative to structures such as a plow blade, harrow element, etc.

The views of FIGS. 3 and 4 are partial side views of the front end of a potato harvester 100, having a forward frame 102, to which the telescoping coulter system 104 and harvester intake 106 are attached. The harvester intake 106 is attached to the frame via a hydraulic cylinder 108, which allows the intake to be lowered to the operational position adjacent to the ground 110, as shown in FIG. 3, and raised above the ground to the transport position, as shown in FIG. 4. A harvester intake pulling arm 112 can also be connected between the harvester intake 106 and the forward frame 102. This can be a pivoting bar, which helps secure the position of the harvester intake 106 relative to the forward frame 102 in both the raised and lowered positions. The harvester intake 106 is a moveable structure, and is a potentially interfering operational structure because its location in the raised position can mechanically interfere with the coulter disk when the coulter disk is raised, in the absence of a telescoping coulter system as disclosed herein.

The telescoping coulter system, indicated generally at 104, is also attached to the forward frame 102 of the harvester device 100, and is positioned ahead of the harvester intake 106, relative to the forward direction of travel of the harvester, as indicated by arrow 114. The telescoping coulter system generally includes a rotatable coulter disk 116, which is pivotally attached to the rear end 132 of a coulter arm 118. The coulter arm 118 is pivotally attached at its forward end 120 at a coulter arm forward pivot point 122 to a lower arm 124 of a pivot link 126. The pivot link 126 is pivotally attached to the forward frame 102 of the harvester 100 at a pivot link pivot point 128. A compression spring assembly 130 is also pivotally attached to the coulter arm 118 near the rear end 132 of the coulter arm 118. This spring assembly can include a slidable central rod with an outer compression spring, which biases the coulter disk 116 downward, but allows the disk to rise up and pass over hard obstacles in the ground 110 as it cuts (the coulter arm 118 pivoting about the coulter arm forward pivot point 122), similar to the operation of a spring-loaded strut associated with a motor vehicle wheel. It is to be understood that, while a spring assembly is shown and described, any type of biasing mechanism that can selectively bias the coulter disk toward the downward position can be used.

The top end of the spring assembly 130 is pivotally attached to the rear arm 134 of a deployment lever 136, which is pivotally attached to the forward frame 102 of the harvester. The forward arm 138 of the deployment lever 136 is pivotally attached to the distal end 140 of a hydraulic cylinder 142, which is pivotally attached at its lower end to the forward frame 102 of the harvester. The distal end 140 of the hydraulic cylinder 142 is also pivotally attached to the top end of a pivot link connecting rod 144, which is pivotally attached at its lower end to an upper arm 146 of the pivot link 126. While a hydraulic cylinder is shown and described, it is to be appreciated that this is only one example of an actuating device that can be used to provide motion to the telescoping coulter system. Those of skill in the art will recognize that other types of actuating devices, such as servo motors, pneumatic systems, etc. can also be used for this purpose. The pivot link connecting rod 144 can include a turnbuckle 148, which allows for adjustment of the length of the pivot link connecting rod 144, which in turn allows adjustment of the telescoping coulter system 104, as discussed in more detail below.

To lower the coulter disk 116 to the working position, as shown in FIG. 3, the hydraulic cylinder 142 extends, pushing upward on the forward arm 138 of the deployment lever 136, causing the deployment lever 136 to rotate counter clockwise. This rotation causes the rear arm 134 of the deployment lever 136 to move downward, thus pushing the spring assembly 130 downward. Downward motion of the spring assembly 130 will push the rearward end 132 of the coulter arm 118 down, which thus pushes the coulter disk 116 into or toward the ground 110.

Concurrently with the downward motion of the coulter disk 116 and the rearward end 132 of the coulter arm 118, upward extension of the hydraulic cylinder 142 also pulls upward on the pivot link connecting rod 144, which rotates the pivot link 126 clockwise, and thus moves the coulter arm forward pivot point 122 rearward. This action causes the coulter arm 118 to move rearward as its forward end moves backward, causing the coulter disk 116 to draw toward the harvester intake 106 as the coulter disk 116 moves downward. Because of this combined downward rotation and rearward translation of the coulter arm 118, in its motion between the raised and lowered positions, the center of the coulter disk 116 describes an arc about a virtual pivot point 150, shown in FIGS. 3 and 4, that is located at a point in space at which physical structure could otherwise tend to interfere with the product flow into the harvester 100. The result is a coulter system 104 that extends or telescopes from an upward and forward transport position that does not interfere with the harvester intake 106, to a downward and rearward operating position, without presenting physical structure (e.g. at or near the virtual pivot point) that could interfere with operation of the harvester.

Additionally, in the lowered operating position, as shown in FIG. 3, there can be an overlap 152 between the back of the coulter blade 116 and the front of the nose wing 154 of the harvester intake 106. This operational configuration helps prevent or reduce the build-up of vines or weeds around the intake 106, and helps prevent or reduce product falling out of the intake 106.

To move the telescoping coulter 104 to the transport position, the hydraulic cylinder 142 is retracted, causing the linkages and parts discussed above to reverse their motion and move the coulter disk 116 back to the raised and forward position. Specifically, the hydraulic cylinder 142 retracts, simultaneously pulling downward on the forward arm 138 of the deployment lever 136 and the top end of the pivot link connecting rod 144. This causes the deployment lever 136 to rotate clockwise, pulling the spring assembly 130 and the rear end 132 of the coulter arm 118 upward. At the same time, downward motion of the pivot link connecting rod 144 rotates the pivot link 126 counter clockwise, and thus pulls the coulter arm forward pivot point 122 forward. This action causes the coulter arm 118 to move forward as its rear end 132 moves upward, thus simultaneously raising the coulter disk 116 and moving it forward and away from the harvester intake 106. It will be apparent that the harvester device 100 can be configured to raise or lower the harvester intake 106 simultaneously with movement of the coulter 116, or these two parts can be raised and lowered independently. Likewise, a single control system can be used for both, or these two systems can be controlled separately.

Advantageously, the configuration of the telescoping coulter system 104 shown in FIGS. 3 and 4 keeps a desired partial overlap condition between the coulter disk 116 and the nose wing 154 of the harvester intake 106 when in the operating position, without creating mechanical interference between these structures in the raised or transport position. As shown in FIG. 3, there is a positive overlap 152 between the coulter disk 116 and the nose wing 154 in the lowered position. This positive overlap helps minimize vine buildup at the intake 106, and also helps prevent potatoes from falling out of the intake. At the same time, the telescoping coulter system 104 creates little or no overlap between the raised coulter disk 116 and the raised nose wing 154 and harvester intake 106 when the harvester 100 is in the transport position, as shown in FIG. 4. This makes it easier to clean out any vine buildup or other accumulation of debris around the nose wing 154.

Figure 5:
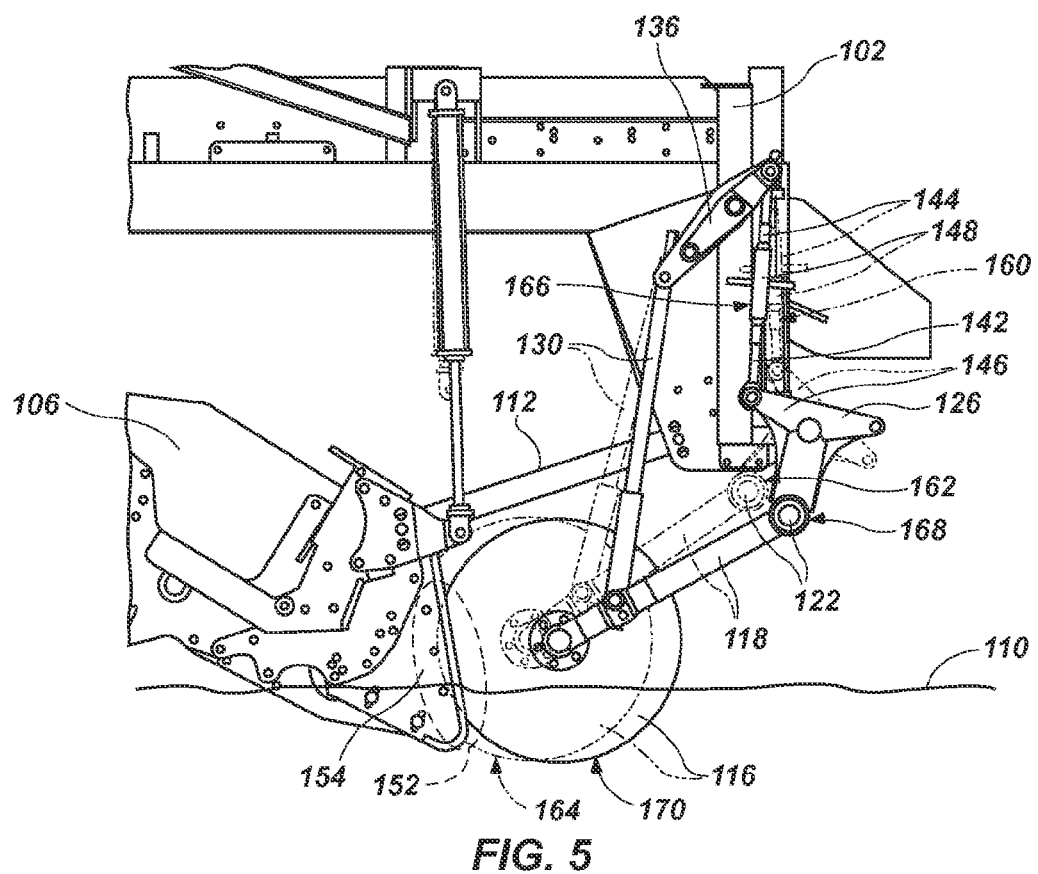
FIG. 5 is a side view of the telescoping coulter of FIG. 3 in the lowered, operational position, showing a range of adjustment of the position of the coulter disk.

As illustrated in FIG. 5, the overlap 152 of the coulter disk 116 and the nose wing 154 of the harvester intake 106 can be adjustable. This can be done by adjusting the length of the pivot link connecting rod 144 via the turnbuckle 148. Adjusting the turnbuckle 148 causes the pivot link connecting rod 144 to shorten or lengthen. Shortening the pivot link connecting rod 144, as shown at 160, causes the coulter arm forward pivot point 122 to move more rearward when in the lowered position, as indicated at 162, and thus increases the overlap 152 of the coulter disk 116 and the nose wing 154 of the harvester intake during operation, as indicated at 164. Conversely, adjusting the turnbuckle 148 to lengthen the pivot link connecting rod 144, as shown at 166, causes the coulter arm forward pivot point 122 to be more forward when in the lowered position, as indicated at 168, and thus decreases the overlap 152 of the coulter disk 116 and the nose wing 154 of the harvester intake 106, as indicated at 170. The turnbuckle 148 can be adjustable over a wide range, allowing the overlap 152 to be adjusted within a very wide range, to allow for different machine configurations and accommodate different operating conditions. It will also be appreciated that other mechanisms can also be used for adjusting the length of the pivot link connecting rod 144, or more generally for adjusting the location of the coulter arm forward pivot point 122 to provide for the adjustable overlap 152.

Figure 6:
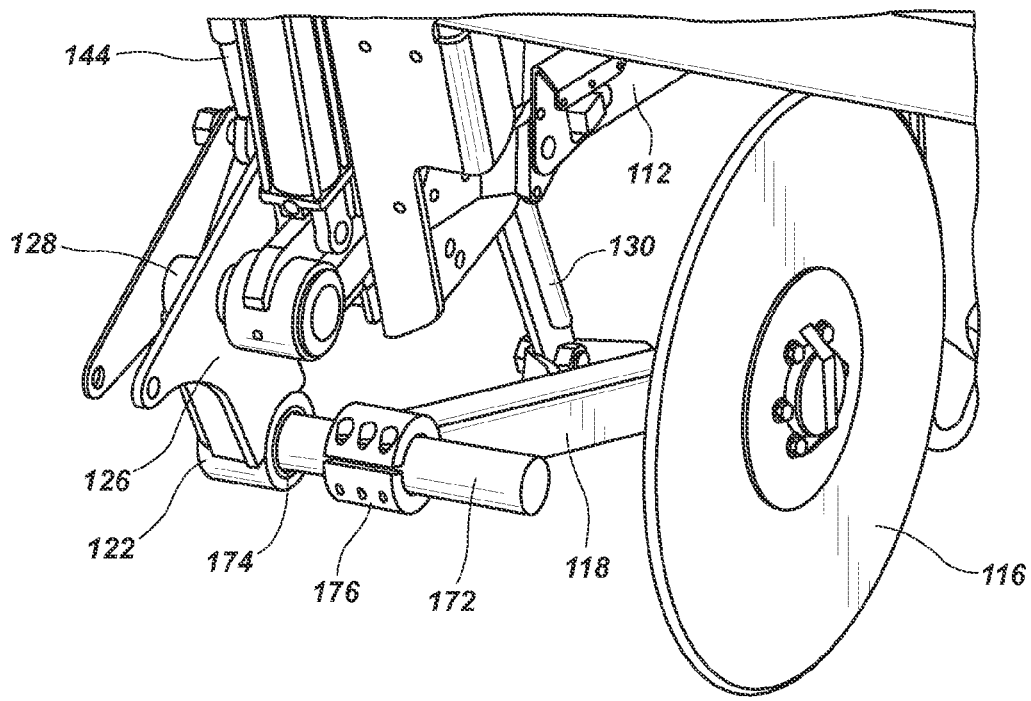
FIG. 6 is a close-up front perspective view of the coulter arm and structure associated with the coulter arm pivot shaft.

The way in which the coulter arm 118 is attached to the pivot link 126 can also be varied. Shown in FIG. 6 is a forward perspective view of one configuration of a connection between the coulter arm 118 and the pivot link 126. It is to be appreciated that this view is looking outward at the interior of a portion of the telescoping coulter mechanism 104, from a nearly opposite perspective than the side views of FIGS. 3-5. In this view the coulter arm 118 is shown connected to a coulter arm pivot shaft 172, which is connected to the pivot link 126 at the coulter arm forward pivot point 122. The spring assembly 130 is also visible, as is the pivot link connecting rod 144 and the harvester intake pulling arm 112. The coulter arm pivot shaft 172 is held at the coulter arm forward pivot point 122 in a bearing 174, which allows the coulter arm pivot shaft 172 to rotate as desired for deployment of the coulter 116 and also to allow the coulter to ride up and down during operation. In this embodiment the coulter arm 118 is fixedly attached to the coulter arm pivot shaft 172 by a removable collar 176. This provides a secure attachment of the coulter arm 118 to the coulter arm pivot shaft 172, and also allows the coulter arm 118 to be removed if desired, such as for repair or replacement.

Figure 7:
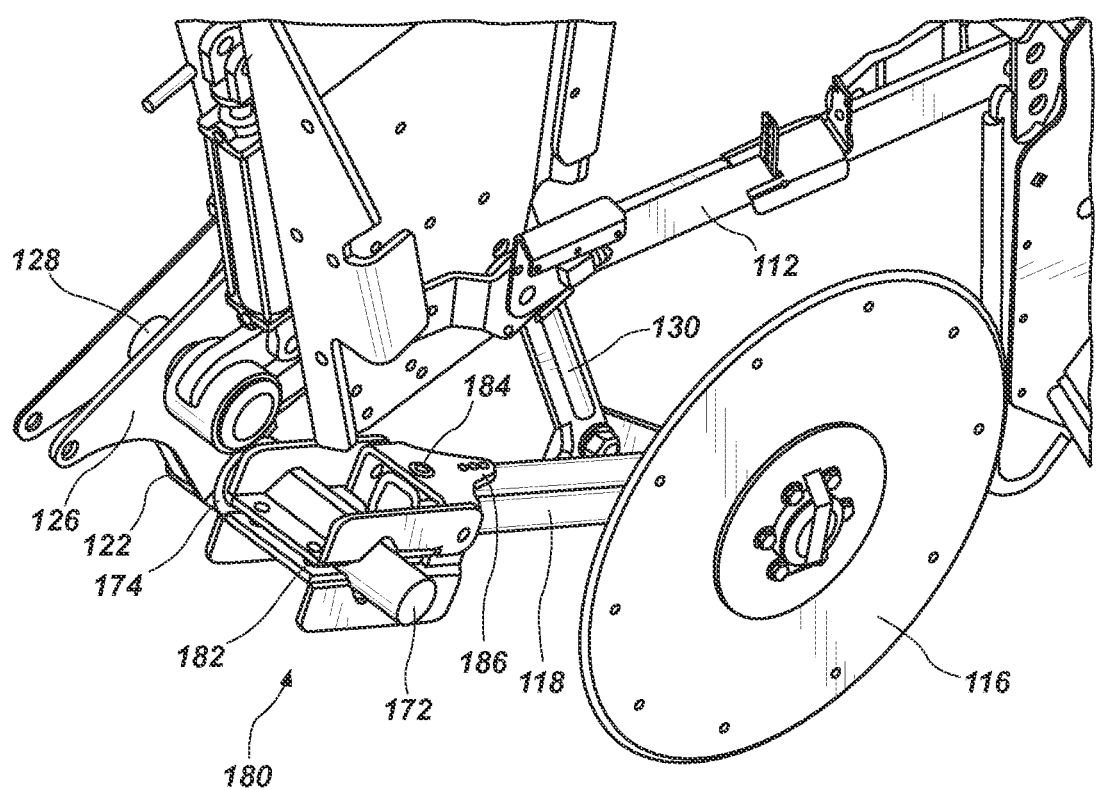
FIG. 7 is a close-up front perspective view of an alternative embodiment of the connection between the coulter arm and the pivot shaft, showing the structure that helps protect the linkage from side loads.

In another embodiment, shown in FIG. 7, the coulter arm 118 can be attached to the coulter arm pivot shaft 172 with a side load safety device, indicated generally at 180. The view of FIG. 7 is taken from a similar perspective to the view of FIG. 6, and shows the coulter arm 118, coulter arm pivot shaft 172, pivot link 126, coulter arm forward pivot point 122, spring assembly 130 and harvester intake pulling arm 112. In this embodiment, the side load safety device 180 includes a coulter arm clamp 182 that is fixedly attached to the coulter arm pivot shaft 172, and the coulter arm 118 is attached to the coulter arm clamp 182 by a lateral pivot pin 184 and one or more shear pins 186 disposed through one or more shear pin holes 187. The different shear pin holes 187 allow for adjustment of the lateral force resistance of the side load safety device 180. Specifically, where a single shear pin 186 is used, as is most likely, it can be inserted into any one of the several shear pin holes to adjust the moment resistance of the side load safety device for different conditions.

The shear pins 186 can be of various materials and configurations. In one embodiment, the shear pin 186 can be a standard grade bolt with a nut to keep it in place. Other materials, including metal, polymers, can also be used for shear pins 186. Under normal operation, the coulter arm 118 is fixed in position relative to the coulter arm pivot shaft 172 by the coulter arm clamp 182 and the lateral pivot pin 184 and shear pin(s) 186. However, if the coulter disk 116 or coulter arm 118 experience a significant lateral load (e.g. a load parallel to the rotational axis of the coulter disk 116), the shear pins 186 can shear off and allow the coulter arm 118 to rotate about the lateral pivot pin 184. Thus, when a significant lateral force is applied to the distal end of the coulter arm 118, the shear pin 186 shears off and lets the coulter arm 118 freely pivot about the pivot pin 184. This gives the coulter disk 116 an almost lateral movement.

This side load safety device 180 keeps the coulter arm 118 in the desired position during normal operation, but prevents undesired or inadvertent lateral loads upon the coulter disk 116 or coulter arm 118 from damaging other elements of the telescoping coulter system 104. Without this side overload protection configuration, a coulter arm 118 that is fixedly connected to the coulter arm pivot shaft 172 and subject to lateral loads could transmit damage to the coulter arm pivot shaft 172, the pivot link 26, and other connected structure. The configuration shown in FIG. 7 thus protects the translating linkage from side loads imposed upon the coulter. It is to be appreciated that the use of a lateral pivot pin and shear pins connecting the coulter arm to the coulter arm pivot shaft is only one mechanism that can be used to protect or insulate the telescoping coulter system from lateral loads upon the coulter disk or coulter arm.

It should be recognized that other types of overload protection systems can be combined with the telescoping coulter system disclosed herein. For example, automated overload protection systems can be used instead of the shear pin configuration shown herein, such as those that are known for plow rock protection systems. Additionally, the design of the coulter arm clamp 182 can be varied for different protection systems.

The mechanism of the telescoping coulter system 104 disclosed herein thus provides a translating linkage that translates the position of a coulter 116 rearward while it also rotates it downward for deployment. The rear arm of the deployment lever 136 (and thus the upper end of the spring assembly 130) moves mostly in an up and down direction, while the lower arm 124 of the pivot link 126 (and thus the pivot connection 122 of the coulter arm 118) moves mostly in a front to back movement. Thus, rotation of the deployment lever 136 generally controls the up and down motion of the coulter disk 116, while rotation of the pivot link 126 generally controls the forward and back motion of the coulter disk 116. The hydraulic cylinder 142 provides an actuator or actuating device, and the deployment lever and pivot link provide first and second levers, respectively, which are connected to the actuating device, either directly or indirectly. The spring assembly provides a first linkage, which pivotally connects the deployment lever (the first lever) to the coulter arm, and the proximal end of the coulter arm is pivotally connected to the pivot link (the second lever).

With this structure, operation of the actuating device simultaneously causes the coulter arm to translate and rotate between the raised transport position and the lowered operational position. When raising or lowering the coulter, this linkage causes the center of the coulter 116 to describe an arc around a virtual pivot point 150 that is located generally forward of the harvester or other agricultural device, at a point in space at which physical structure could otherwise interfere with the product flow. Advantageously, the telescoping coulter system can be configured so that the virtual pivot point 150 lies between crop rows. Nevertheless, the actual mechanical parts of the coulter extension mechanism are disposed above the crops, to avoid interference. The result is a coulter system 104 that extends or telescopes between an upward and forward transport position, and a downward and rearward operating position, without presenting interfering physical structure.

The telescoping coulter system also is adjustable, allowing adjustment of the overlap of the coulter disk with an intake structure. Additionally, the attachment of the coulter arm to the remainder of the system can include a side load protection system, that protects the translating linkage from side loads imposed upon the coulter.

It will be apparent that the present disclosure also describes a method of making a telescoping coulter system for an agricultural device having a moveable and/or potentially interfering structure. The method of making this device includes the steps of rotatably attaching a coulter disk to a distal end of a coulter arm, and attaching the coulter arm to an extension mechanism configured to translate the coulter arm between a raised position not in mechanical conflict with the moveable structure, and a lowered operational position in which the coulter disk can contact ground and is proximate to the moveable structure.

The step of attaching the coulter arm to the extension mechanism can further include attaching a first linkage between a first lever and a position on the coulter arm near the distal end, pivotally attaching a proximal end of the coulter arm to a second lever, and attaching the first and second levers to an actuator configured to rotate the first and second levers. The method of making the telescoping coulter can further include attaching an adjustable linkage between the actuator and the second lever, the adjustable linkage having an adjustable length, whereby the proximity of the coulter disk to the moveable structure, when in the lowered operational position, is adjustable. The method can also include attaching a lateral force overload device at a proximal end of the coulter arm, configured to selectively allow lateral motion of the coulter arm relative to the extension mechanism in response to inadvertent lateral loads upon the coulter disk or coulter arm.

Making this system can also involve moving the extension mechanism to translate the coulter arm between the raised position and the lowered operational position. Such movement can be associated with adjustment of the system during manufacture, for example. Moving the extension mechanism can include moving the coulter disk in an arc about a virtual pivot point located generally forward of the agricultural device.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A telescoping coulter system for an agricultural machine operable on ground, having a frame and a moveable structure, comprising:
   a coulter arm, having a proximal end with a pivot point, and a distal end bearing a rotatable coulter disk, the coulter disk having a raised transport position away from the moveable structure and above the ground, and a lowered operational position in contact with the ground and proximate to the moveable structure; and
   an extension mechanism, connecting the frame to the coulter arm, including a translating linkage configured to simultaneously translate and rotate the coulter arm to move the coulter disk between the raised transport position and the lowered operational position.

2. A telescoping coulter system in accordance with claim 1, wherein the agricultural machine comprises a harvester, and the moveable structure comprises an intake of the harvester.

3. A telescoping coulter system in accordance with claim 2, further comprising a nose wing at a side of the intake of the harvester, the coulter disk overlapping at least a portion of the nose wing when in the lowered operational position.

4. A telescoping coulter system in accordance with claim 1, further comprising a biasing mechanism, configured to selectively bias the coulter disk toward the lowered operational position.

5. A telescoping coulter system in accordance with claim 1, wherein the translating linkage includes
   an actuating device;
   first and second levers, connected to the actuating device; and
   a first linkage, pivotally connecting the first lever to the coulter arm, the pivot point of the coulter arm being connected to the second lever, operation of the actuating device simultaneously causing the coulter arm to translate and rotate to move the coulter disk between the raised position and the lowered position.

6. A telescoping coulter system in accordance with claim 5, wherein the first linkage comprises a biasing mechanism, configured to bias the coulter disk toward contact with the ground.

7. A telescoping coulter system in accordance with claim 5, further comprising an adjustable linkage, interconnecting the actuating device and the second lever, configured to allow adjustment of the proximity of the coulter disk and the moveable structure when in the lowered position.

8. A telescoping coulter system in accordance with claim 7, wherein the adjustable linkage comprises a turnbuckle, configured to allow adjustment of a length of the adjustable linkage.

9. A telescoping coulter system in accordance with claim 1, further comprising a lateral force overload device, disposed at the proximal end of the coulter arm, configured to selectively allow lateral motion of the coulter arm relative to the extension mechanism in response to inadvertent lateral loads upon the coulter disk or coulter arm.

10. A potato harvester having a telescoping coulter system, comprising:
    an intake, having a nose wing, the intake being moveable between a lowered operating position adjacent ground, and a raised transport position above the ground;
    a coulter disk, moveable about a virtual pivot point from a lowered operating position, in which the coulter disk is proximate to the nose wing, and a raised transport position in which the coulter disk does not mechanically interfere with the intake or nose wing;
    an extension mechanism; and
    a coulter arm, having a proximal end pivotally connected to the extension mechanism, and a distal end, the coulter disk being rotatably attached to the distal end, the extension mechanism configured to simultaneously translate and rotate the coulter arm to move the coulter disk about the virtual pivot point.

11. A potato harvester in accordance with claim 10, wherein the extension mechanism comprises a translating linkage, comprising:
    an actuating device;
    first and second levers, connected to the actuating device; and
    a first linkage, pivotally connecting the first lever to the coulter arm, the pivot point of the coulter arm being connected to the second lever, operation of the actuating device simultaneously causing the coulter arm to translate and rotate to move the coulter disk between the raised position and the lowered position.

12. A potato harvester in accordance with claim 11, wherein the first linkage comprises a biasing mechanism, configured to bias the coulter disk toward contact with the ground.

13. A potato harvester in accordance with claim 11, further comprising an adjustable linkage, interconnecting the actuating device and the second lever, configured to allow adjustment of the proximity of the coulter disk and the nose wing when in the lowered position.

14. A potato harvester in accordance with claim 10, further comprising a lateral force overload device, disposed at the proximal end of the coulter arm, configured to selectively allow lateral motion of the coulter arm relative to the extension mechanism in response to inadvertent lateral loads upon the coulter disk or coulter arm.

15. A method of making a telescoping coulter system for an agricultural device having a moveable structure, comprising:
    rotatably attaching a coulter disk to a distal end of a coulter arm; and
    attaching the coulter arm to an extension mechanism configured to simultaneously translate and rotate the coulter arm between a raised position not in mechanical conflict with the moveable structure, and a lowered operational position in which the coulter disk can contact ground and is proximate to the moveable structure.

16. A method in accordance with claim 15, wherein attaching the coulter arm to the extension mechanism further comprises:
    attaching a first linkage between a first lever and a position on the coulter arm near the distal end;
    pivotally attaching a proximal end of the coulter arm to a second lever; and
    attaching the first and second levers to an actuator configured to rotate the first and second levers.

17. A method in accordance with claim 16, further comprising attaching an adjustable linkage between the actuator and the second lever, the adjustable linkage having an adjustable length, whereby the proximity of the coulter disk to the moveable structure, when in the lowered operational position, is adjustable.

18. A method in accordance with claim 15, further comprising attaching a lateral force overload device at a proximal end of the coulter arm, configured to selectively allow lateral motion of the coulter arm relative to the extension mechanism in response to inadvertent lateral loads upon the coulter disk or coulter arm.

* * * * *